United States Patent
Nakagawa et al.

(10) Patent No.: US 6,675,574 B2
(45) Date of Patent: Jan. 13, 2004

(54) CONTROL UNIT FOR INTERNAL COMBUSTION ENGINE

(75) Inventors: Shinji Nakagawa, Hitachinaka (JP); Minoru Ohsuga, Hitachinaka (JP); Masami Nagano, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/193,207

(22) Filed: Jul. 12, 2002

(65) Prior Publication Data

US 2003/0010018 A1 Jan. 16, 2003

(30) Foreign Application Priority Data

Jul. 13, 2001 (JP) .......................................... 2001-213873

(51) Int. Cl.[7] ................................................ F01N 3/00
(52) U.S. Cl. .............................. 60/284; 60/285; 60/300
(58) Field of Search .......................... 60/284, 285, 297, 60/299, 300

(56) References Cited

U.S. PATENT DOCUMENTS

| | | | | |
|---|---|---|---|---|
| 5,678,403 A | * | 10/1997 | Kanehara et al. | 60/309 |
| 5,758,493 A | * | 6/1998 | Asik et al. | 60/274 |
| 5,771,685 A | * | 6/1998 | Hepburn | 60/274 |
| 5,832,722 A | * | 11/1998 | Cullen et al. | 60/274 |
| 5,974,788 A | * | 11/1999 | Hepburn et al. | 60/274 |
| 5,983,627 A | * | 11/1999 | Asik | 60/274 |
| 6,164,064 A | * | 12/2000 | Pott | 60/277 |
| 6,311,482 B1 | * | 11/2001 | Yamashita | 60/285 |
| 6,334,306 B1 | * | 1/2002 | Mori et al. | 60/297 |
| 6,513,322 B2 | * | 2/2003 | Ohuchi et al. | 60/285 |

FOREIGN PATENT DOCUMENTS

| | | | |
|---|---|---|---|
| GB | 2329260 | * | 3/1999 |
| JP | 5-33705 | | 2/1993 |
| JP | 05-033705 | * | 2/1993 |

* cited by examiner

*Primary Examiner*—Thomas Denion
*Assistant Examiner*—Diem Tran
(74) *Attorney, Agent, or Firm*—Crowell & Moring LLP

(57) ABSTRACT

A control unit for an internal combustion engine can activate a three-way catalyst at the early stage and can lessen the deterioration of the exhaust in an internal combustion engine such as HC, CO, and NOx, etc. from the exhaust gas when starting. The control unit for an internal combustion engine is provided with the three-way catalyst and HC adsorbent on an exhaust side. The control unit alternately controls the A/F between a rich state and a lean state in order to quicken the activation of the three-way catalyst when the internal combustion engine starts.

2 Claims, 16 Drawing Sheets

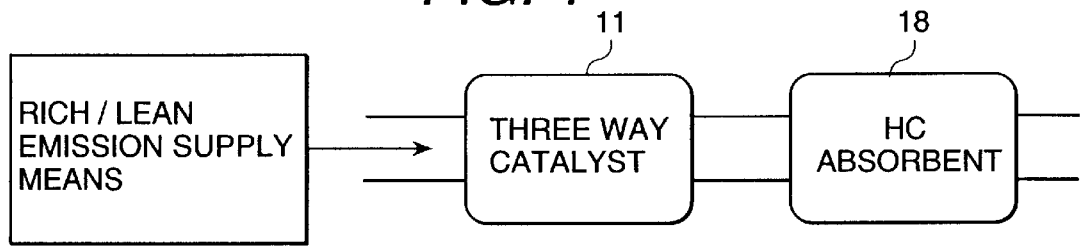
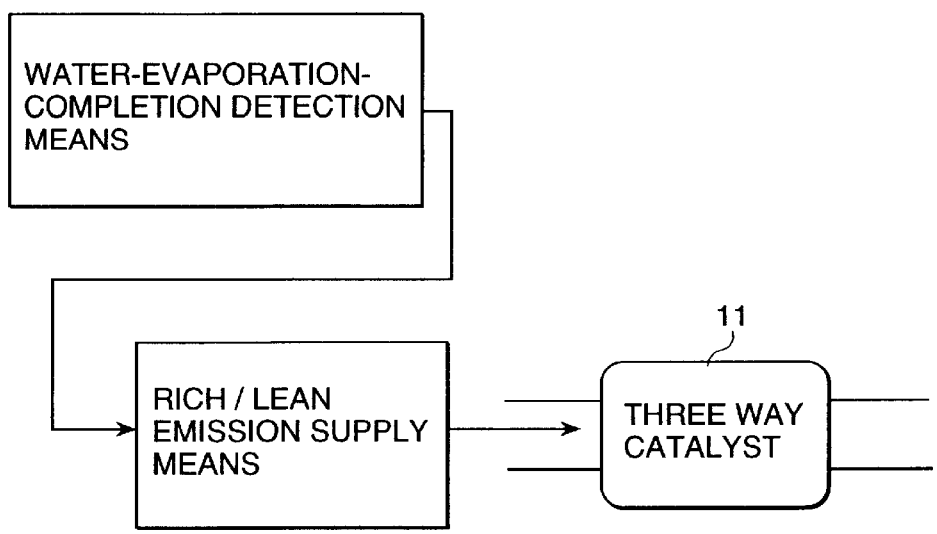
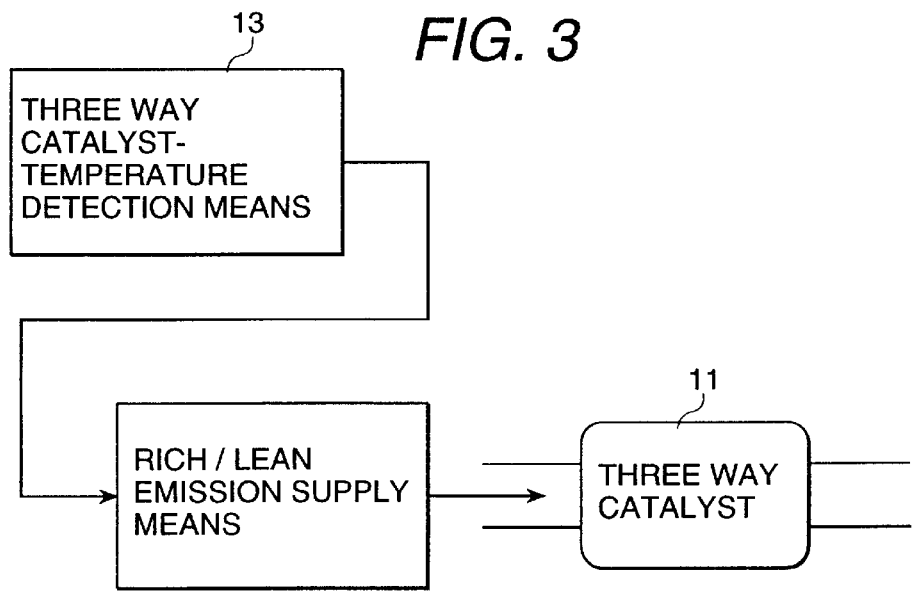

BASIC FUEL INJECTION CALCULATION UNIT

A/F CORRECTION TERM ARITHMETIC UNIT

RICH/LEAN CONTROL PERMISSION JUDGEMENT UNIT

1 CYLINDER A/F CORRECTION TERM CALCULATION UNIT

2 CYLINDER A/F CORRECTION TERM CALCULATION UNIT

3 CYLINDER A/F CORRECTION TERM CALCULATION UNIT

4 CYLINDER A/F CORRECTION TERM CALCULATION UNIT

CONTROL UNIT FOR INTERNAL COMBUSTION ENGINE

BACKGROUND OF THE INVENTION

The present invention relates to a control unit for an internal combustion engine, especially to a control unit for an internal combustion engine to activate quickly a three-way catalyst when the internal combustion engine starts, and to efficiently adsorb and purification HC.

The worldwide demand for energy saving and the environmental protection keeps strengthening more and more in the automotive environment in recent years, and fuel cost restriction and emission control, etc. have been reinforced.

In general, a three-way catalyst for oxidizing HC and CO in the exhaust gas exhausted to the exhaust pipe by the internal combustion engine and reducing NOx to pass emission controls has been installed in automobile engines. Although the three-way catalyst can purify HC, CO, and NOx in exhaust gas at or above a fixed temperature, it cannot usually purify enough HC, CO, and NOx at a temperature below a fixed temperature.

In general, an internal combustion engine is at low temperature when starting. Because the purification performance of exhaust gas is remarkably low for the period prior to the three-way catalyst exceeding a fixed temperature as shown in FIG. 7 (FIG. 7 shows an example of HC), it is important to activate the three-way catalyst at the early stage when starting to decrease HC, CO, and NOx in exhaust gas. Therefore, a lot of the techniques have been proposed so far.

In the technology according to the Japanese Patent Application Laid-Open No. 5-33705, by alternately supplying the rich exhaust and the lean exhaust; to the three-way catalyst, CO and HC including in the rich exhaust and $O_2$ in the lean exhaust are made to react with each other, and the catalyst is warmed up with the heat of reaction.

Though in the aforementioned technology CO and HC in the rich exhaust and $O_2$ in the lean exhaust are made to burn by alternately supplying the rich exhaust and the lean exhaust to the three-way catalyst, not all exhausted HC and CO necessarily burns, and the unburned components are exhausted outside through the catalyst. Therefore, HC and CO removal is not improved though the object of warming up the catalyst can be achieved. In fact, HC deterioration when starting the engine has become a big problem because of the restriction reinforcement of the exhaust gas in recent years.

SUMMARY OF THE INVENTION

The present invention arose from a consideration of these problems. An object of the present invention is to provide a control unit for an internal combustion engine in which the three-way catalyst is activated at the early stage when the internal combustion engine starts, and the deterioration of components such as HC, CO, and NOx in exhaust gas from an internal combustion engine is reduced.

A control unit for an internal combustion engine including the three-way catalyst and HC adsorbent on an exhaust side can alternately control the A/F between a rich state and a lean state in order to quicken the activation of the three-way catalyst when the internal combustion engine starts (FIG. 1).

The control unit for an internal combustion engine of the present invention configured like the above-mentioned can raise the temperature of the three-way catalyst by alternately supplying rich exhaust and lean exhaust to the three-way catalyst, and by the heat of reaction of CO, HC in the rich exhaust and $O_2$ in the lean exhaust. In addition, by installing HC adsorbent downstream of the three-way catalyst and by supplying the rich exhaust and the lean exhaust, the three-way catalyst can be activated at the early stage without deteriorating the exhaust gas by adsorbing HC emitted downstream of the three-way catalyst by using HC adsorbent.

Moreover, a control unit for an internal combustion engine according to another embodiment of the present invention has a means for detecting completion of the evaporation of moisture in the three-way catalyst directly or indirectly. The control unit alternately controls the A/F between a rich state and a lean state in order to quicken the activation of the three-way catalyst after the completion of the evaporation of moisture in the three-way catalyst is detected (see FIG. 2). Further, the ignition time is retarded for the period until moisture in the three-way catalyst evaporates directly after the start of the internal combustion engine.

In the control unit for an internal combustion engine of the present invention configured as above-mentioned, the reason for the supply of rich/lean exhaust to the three-way catalyst is that the temperature of precious metals in the three-way catalyst are raised. If the precious metals have been partially activated, the reaction proceeds further in that part, and the activation of precious metals in the catalyst is advanced continuously by the heat of reaction. The three-way catalyst can be activated at the early stage without deteriorating the exhaust by supplying rich/lean exhaust after water in the three-way catalyst evaporates, because the heat of reaction can be efficiently supplied to precious metals if there is no moisture in the three-way catalyst. Moreover, the exhaust temperature is raised by retarding the ignition time directly after the start, whereby moisture in the catalyst evaporates promptly, and the supply of rich/lean exhaust is controlled at the early stage, because the activation time is shortened by the shortened time for water to evaporate.

Further, a control unit for an internal combustion engine according to a further embodiment of the present invention has a means for detecting the temperature of the three-way catalyst directly or indirectly. The control unit alternately controls the A/F between a rich state and a lean state in order to quicken the activation of the three-way catalyst when the temperature of the three-way catalyst is a value within the fixed range (FIG. 3).

The control unit for an internal combustion engine of the present invention configured as above-mentioned can estimate the evaporation of the moisture in the catalyst by directly or indirectly detecting the temperature of the catalyst, and control the supply rich/lean exhaust with a high degree of accuracy by setting the temperature of the catalyst to the value within the fixed range.

Further, a control unit for an internal combustion engine according to a further embodiment of the present invention has a means for detecting the operating state of the internal combustion engine. The control unit alternately controls the A/F between a rich state and a lean state in order to quicken the activation of the three-way catalyst based on the operating state (FIG. 4).

The control unit for an internal combustion engine of the present invention configured like the above-mentioned can control the supply rich/lean exhaust with a higher degree of accuracy by estimating the temperature of the catalyst and estimating the evaporation of the moisture in the catalyst based on the operating state of the internal combustion engine, for instance, the time after the engine starts, the water temperature, total air flow rate after the engine starts and so on.

Further, the control unit for an internal combustion engine according to a further embodiment of the present invention has a means for detecting the temperature of the HC adsorbent directly or indirectly. The control unit alternately controls the A/F between a rich state and a lean state in order to change the temperature of the HC adsorbent. The control unit alternately controls the A/F between a rich state and a lean state when the temperature of the HC adsorbent is within the fixed range (FIG. 5).

In the control unit for an internal combustion engine of the present invention configured as above-mentioned, the HC adsorbent has the characteristic that HC is adsorbed at a temperature below a fixed one, and is desorbed at a temperature more than a fixed one because the HC adsorbent loses the adsorbent characteristic. In general, the HC desorption temperature is much lower than the activating temperature of the three-way catalyst, i.e., the difference between these temperatures is large, and there is a temperature rise characteristic in which each phase of HC adsorbent, desorption, and purification becomes optimal. The temperature of the three-way catalyst is adjusted by controlling the supply of rich/lean exhaust appropriately paying attention to the above-mentioned. As a result, it is possible to control the temperature rise characteristic of the HC adsorbent to become optimal.

Further, a control unit for an internal combustion engine according to a further embodiment of the present invention has the three-way catalyst and HC adsorbent in the same carrier on an exhaust side alternately controls the A/F between a rich state and a lean state in order to change the temperature of the HC adsorbent (FIG. 6).

In the control unit for an internal combustion engine of the present invention configured as above-mentioned, the temperature of the three-way catalyst is raised by the heat of reaction of $O_2$ in the lean exhaust and CO, and HC in the rich exhaust by alternately supplying the rich exhaust and the lean exhaust to the catalyst supported by the same carrier. In addition, HC separated from the three-way catalyst is adsorbed by the HC adsorbent by supplying the rich exhaust and the lean exhaust. As a result, the exhaust gas is not deteriorated, and the three-way catalyst is activated at the early stage. However, it is preferable that the temperature downstream of the catalyst is set such that the evaporation of the moisture in the three-way catalyst is not completed but the adsorbed HC in HC adsorption catalyst begins to separate.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only. In the drawings:

FIG. 1 shows a control unit for an internal combustion engine according to the present invention.

FIG. 2 shows another control unit for an internal combustion engine according to the present invention.

FIG. 3 shows still another control unit for an internal combustion engine according to the present invention.

DESCRIPTION OF THE PREFERRED EMBODIMENTS

Figure 4:
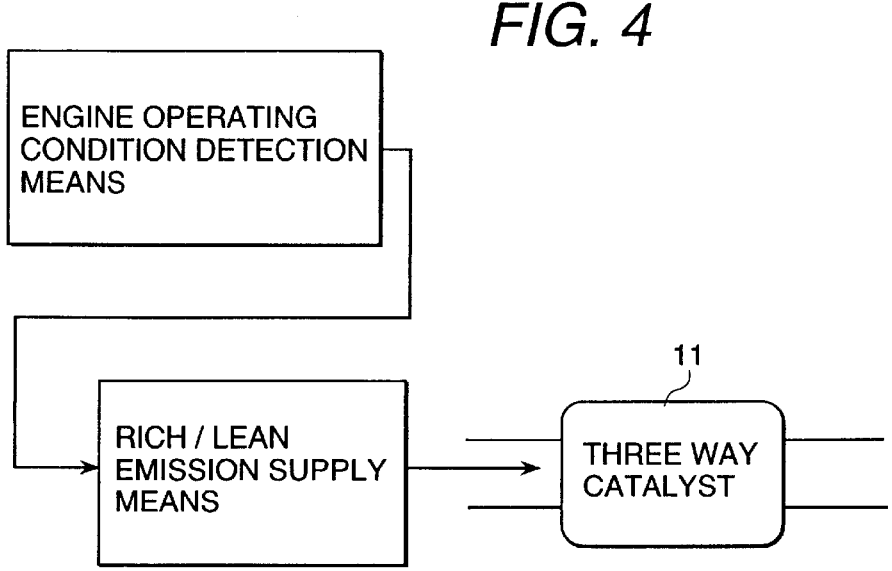
FIG. 4 shows a further embodiment of a control unit for an internal combustion engine according to the present invention.
Figure 5:
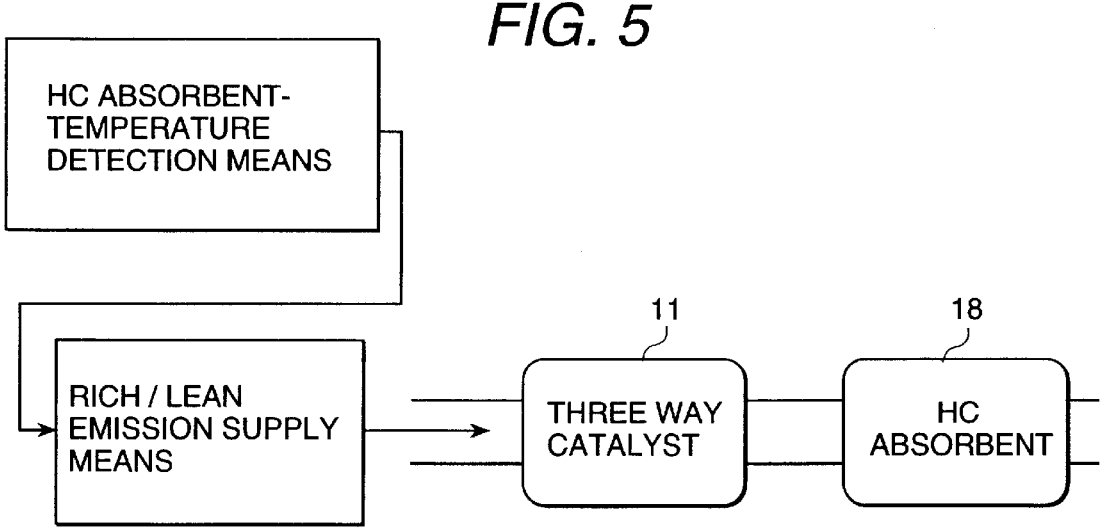
FIG. 5 shows yet a further control unit for an internal combustion engine according to the present invention.
Figure 6:
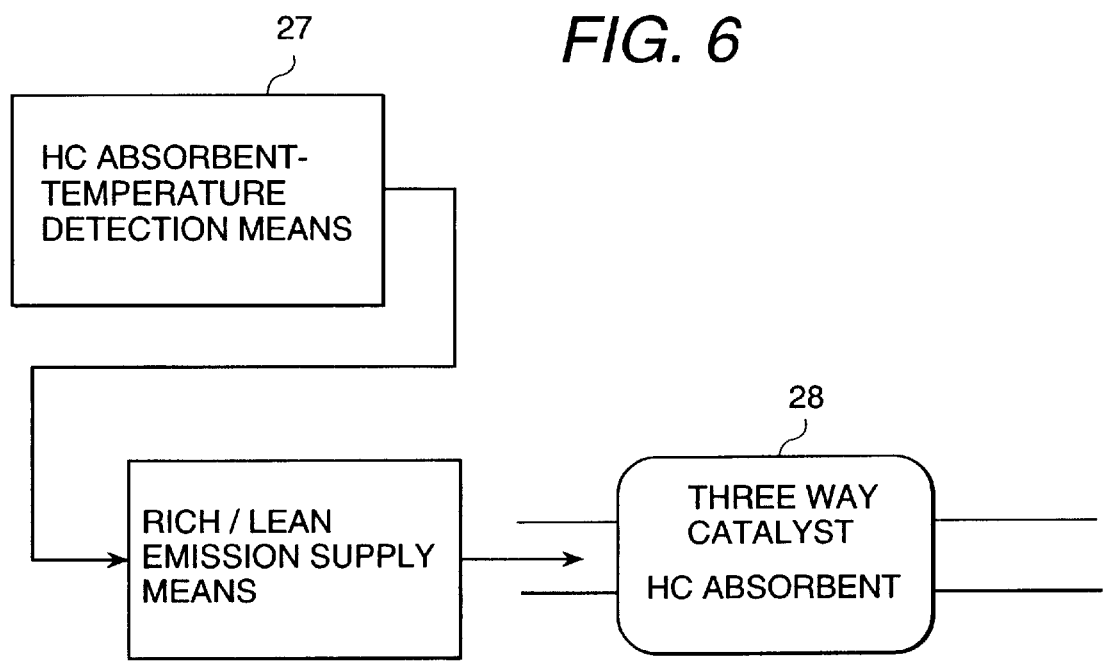
FIG. 6 shows still another control unit for an internal combustion engine according to the present invention.
Figure 7:
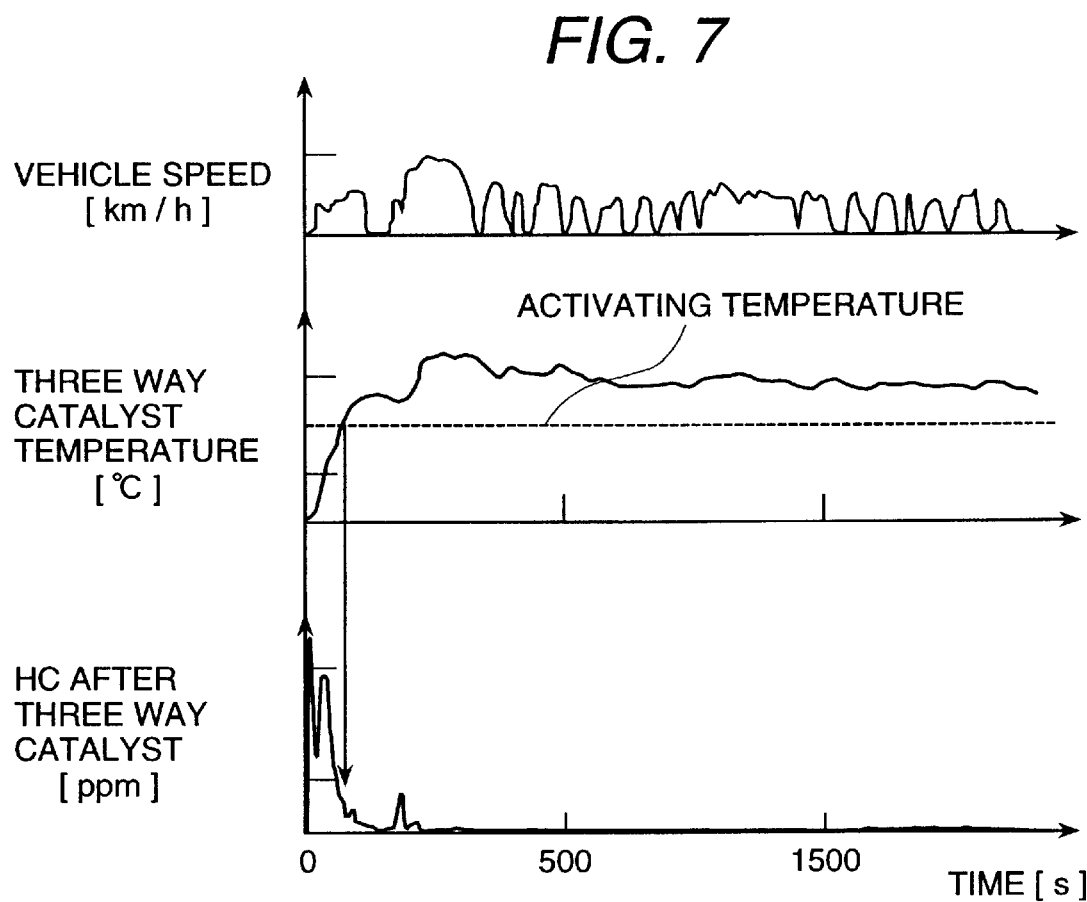
FIG. 7 shows the temperature of three-way catalyst under a vehicle running condition and a HC emission characteristic after the three-way catalyst.

The present invention will be discussed hereinafter in detail in terms of the preferred embodiment according to the present invention with reference to the accompanying drawings. In the following description, numerous specific details are set forth in order to provide a thorough understanding of the present invention. It will be apparent, however, to those skilled in the art that the present invention may be practiced without these specific details. In other instance, well-known structures are not shown in detail in order to avoid unnecessary obscurity of the present invention.

Some embodiments of a control unit for an internal combustion engine of the present invention are explained in detail hereafter referring to the drawing.

First Embodiment

Figure 8:
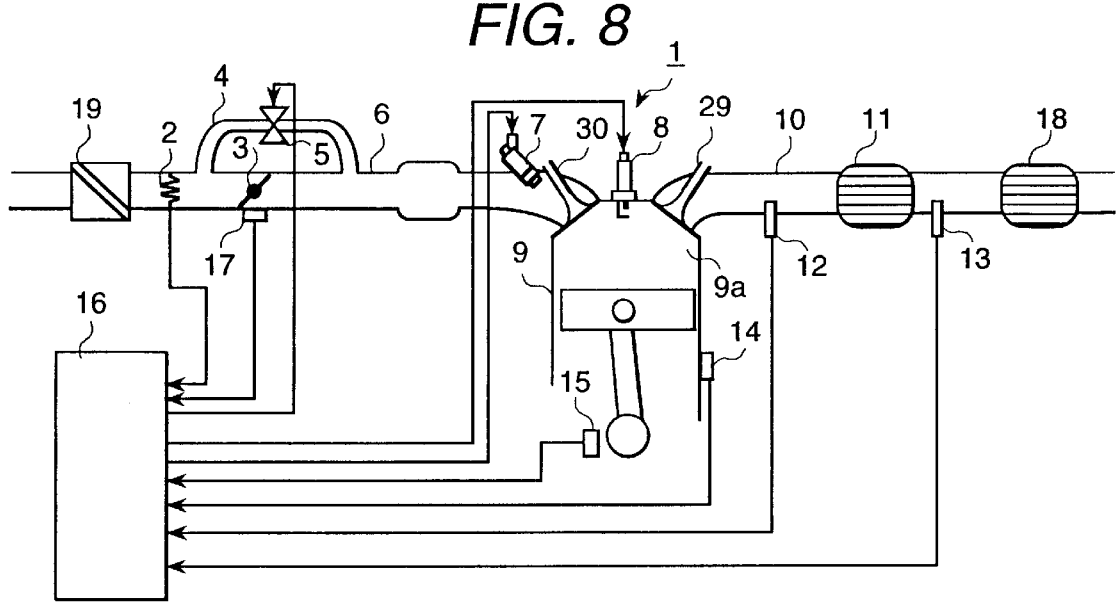
FIG. 8 shows the overall internal combustion engine system according to a first embodiment of the control unit for an internal combustion engine of the present invention.

FIG. 8 shows the overall internal combustion engine system according to a first embodiment of the control unit for an internal combustion engine of the present invention.

Internal combustion engine 1 is configured of the internal combustion engine of the multi-cylinder type. In an air intake system, outside air passes air cleaner 19, flows into combustion chamber 9a in cylinder 9 through intake manifold 6. Although an amount of the inflow air is chiefly adjusted with throttle 3, the air amount is adjusted with ISC valve 5 installed in air passage 4 for the by-pass at idling, and the engine speed of the internal combustion engine is controlled. Fuel injection valve 7 for each cylinder is installed in intake manifold 6. Spark plug 8 is installed in cylinder 9 of each cylinder, and intake valve 29 and exhaust valve 30 are also arranged therein.

Moreover, in an exhaust system, exhaust manifold 10 is connected to cylinder 9 i.e., to each cylinder, and the three-way catalyst 11 and HC adsorption catalyst 18 are arranged in the exhaust manifold 10 in the order. Air flow sensor 2 is arranged in intake manifold 6 of the air intake system to detect an amount of the intake air. Crank angle sensor 15 outputs a signal every one degree of the rotation angle of the crankshaft. Throttle opening sensor 17 installed in electronic throttle 3 detects the opening of electronic throttle 3, and water temperature sensor 14 detects the temperature of the cooling water for the internal combustion engine.

Each signal from air flow sensor 2, opening sensor 17 installed in throttle 3, crank angle sensor 15, and water temperature sensor 14 is sent to control unit 16. The operating state of internal combustion engine 1 is obtained from these sensor outputs, and the main manipulated variable of the ignition time and the basic injection amount of the fuel are calculated appropriately. Fuel injection amount calculated in control unit 16 is converted into a valve-open pulse signal and is sent to fuel injection valve 7 installed in the intake pipe of each cylinder. Therefore, fuel injection amount can be controlled for every cylinder.

Moreover, the predetermined ignition time is calculated in control unit 16, and a driving signal is sent to spark plug 8 so that it can be ignited at its ignition time. The fuel injected from fuel injection valve 7 flows into combustion chamber 9a of internal combustion engine 1, and forms the air-fuel mixture by being mixed with the air from intake manifold 6. The air-fuel mixture is exploded by the spark generated by spark plug 8, and the energy generated at that time becomes the power source for internal combustion engine 1.

The exhaust gas after explosion is sent to three-way catalyst 11 through exhaust manifold 10 to purify HC, CO, and NOx. HC adsorption catalyst 18 has the three-way characteristic inside, i.e., the function of purifying the desorbed HC.

A/F sensor 12 is installed between cylinder 9 of internal combustion engine 1 and three-way catalyst 11, which has a linear output characteristic with respect to the oxygen concentration included in the exhaust gas. Because the relationship between the oxygen concentration included in the exhaust gas and the A/F is approximately linear, it is possible to detect the A/F by A/F sensor 12 which detects the oxygen concentration. Moreover, temperature sensor 13 is installed downstream of three-way catalyst 11. Therefore, the detection of the temperature downstream of three-way catalyst 11 is enabled.

In control unit 16, the A/F upstream of three-way catalyst 11 is calculated from a signal of A/F sensor 12, and the amount of the fuel supplied to internal combustion engine 1 is controlled to provide an A/F whose purification efficiency is the highest in three-way catalyst 11.

Figure 9:
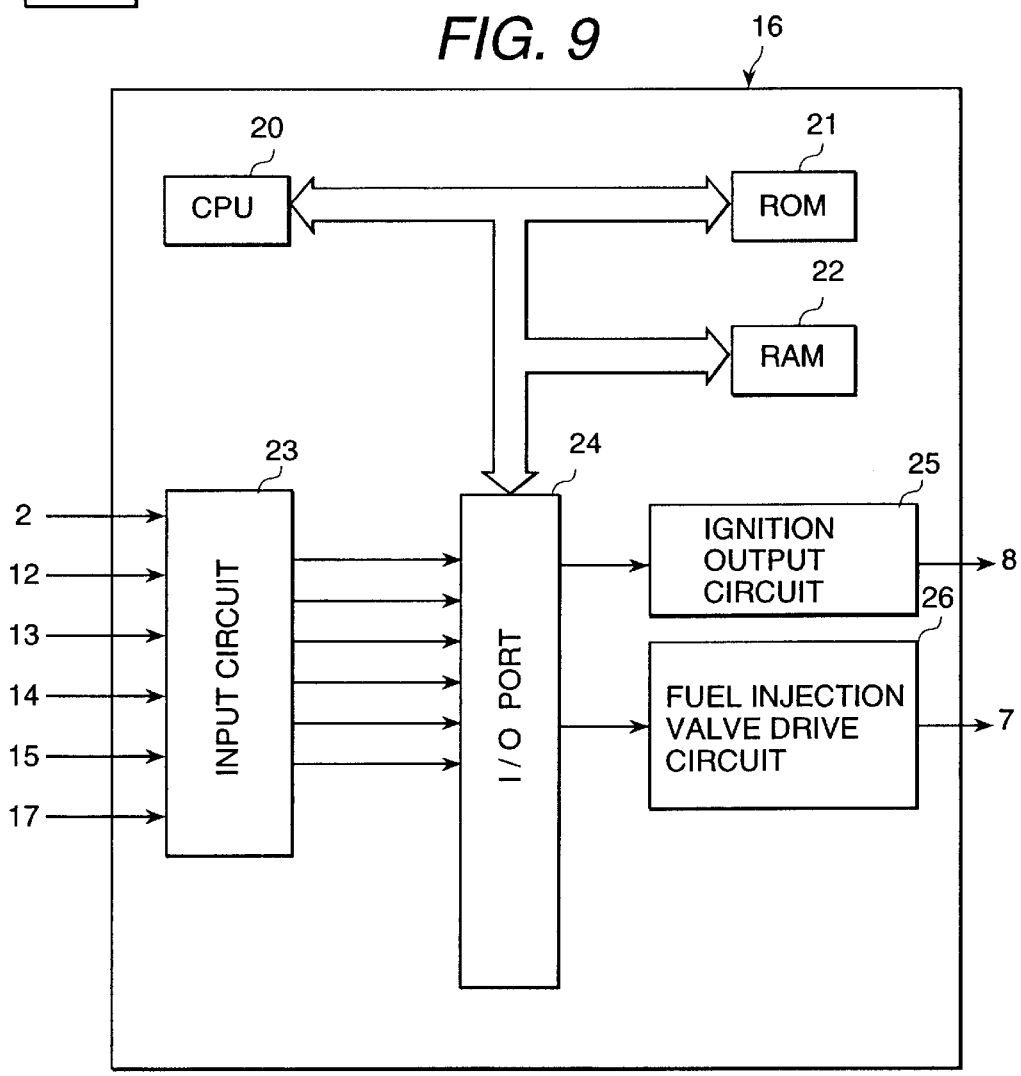
FIG. 9 shows the internal construction of a control unit for the internal combustion engine shown in FIG. 8.

FIG. 9 shows the inside of the control unit (ECU) 16 shown in FIG. 8. The output value of each sensor of air flow sensor 2, A/F sensor 12, temperature sensor 13, water temperature sensor 14, internal combustion engine revolution speed sensor 15, and throttle valve opening sensor 17 is input in ECU 16, and after the signal processing such as noise rejection, etc. is carried out in input circuit 23, the signal is sent to I/O port 24. The value of I/O port 24 is kept in RAM 22, and the operation processing is carried out in CPU20. A control program which describes the content of the operation processing is written in ROM 21 beforehand. The value which indicates the amount of each actuator operation calculated according to control program is kept in RAM 22. Then, it is sent to I/O port 24. An ON/OFF signal is set as an operation signal of spark plug 8, in which it is turned on at a conduction state of the primary coil in ignition output circuit 25, and it is turned off at a non-conduction state of the primary coil. The ignition time is when the operation signal changes to turning-off from turning-on. The signal for the spark plug set in I/O port 24 is amplified into enough energy necessary for combustion in ignition output circuit 25 and supplied to spark plug 8. An ON/OFF signal is set as a driving signal of fuel injection valve 7, in which the ON/OFF signal is turned on at valve-open and turned off at valve-close. The driving signal is amplified into energy enough to open fuel injection valve 7 in fuel injection, valve drive circuit 26, and sent to fuel injection valve 7.

Figure 10:
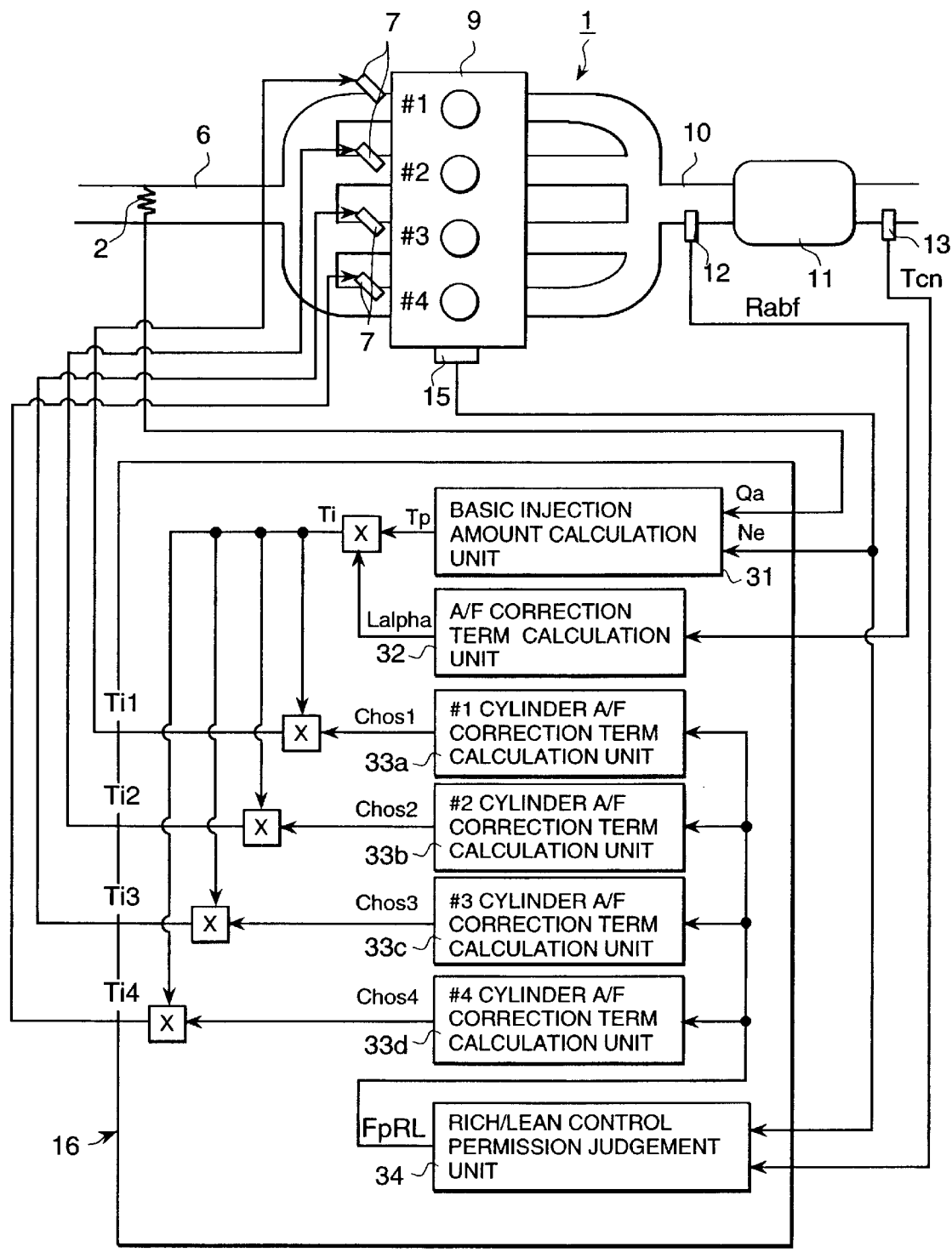
FIG. 10 shows a control unit for an internal combustion engine shown in FIG. 9.

FIG. 10 is a control block diagram showing the entire control of control unit 16 according to the embodiment shown in FIG. 9. The control unit 16 comprises basic fuel injection amount calculation unit 31, A/F correction term calculation unit 32, #1 cylinder A/F correction amount calculation unit 33a, #2 cylinder A/F correction amount calculation unit 33b, #3 cylinder A/F correction amount calculation unit 33c, #4 cylinder A/F correction amount calculation unit 33d, and rich/lean control permission judgment part 34.

When the rich/lean control is not permitted, the fuel injection amount for each cylinder is calculated so that the A/F for all cylinders may become the theoretical air-fuel (A/F) ratio. When rich/lean control is permitted, the A/F for each cylinder is changed in the specified amount in order to activate three-way catalyst 11 at the early stage by supplying the rich exhaust and the lean exhaust to the entrance of three-way catalyst 11. Hereinafter, each calculation unit of the control unit 16 will be explained in detail.

1. Basic fuel injection amount calculation unit 31.

Figure 11:
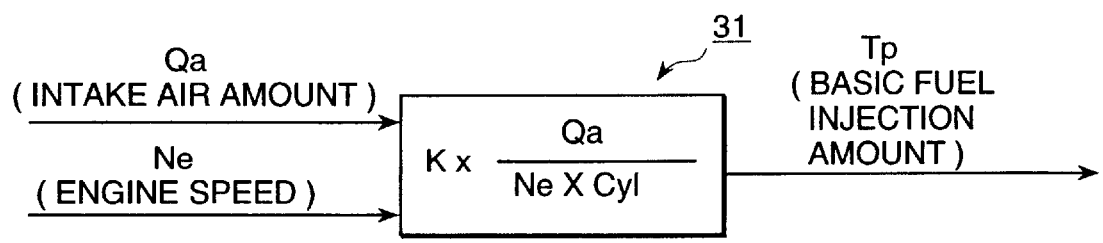
FIG. 11 shows a basic fuel calculation unit in the control block diagram of FIG. 10.

FIG. 11 shows basic fuel injection amount calculation unit 31. The basic fuel injection amount calculation unit 31 calculates the fuel injection amount to achieve the target torque and the target A/F at the same time in an arbitrary operating condition based on an amount of the inflow air into internal combustion engine 1. Concretely, basic fuel injection amount Tp is calculated as shown in FIG. 11. Here, K is a constant, which always make A/F adjust the theoretical A/F for the amount of the inflow air. Further, Cyl indicates the number of cylinders of internal combustion engine 1, and the number of cylinders is 4 in this embodiment.

2. A/F correction term calculation unit 32.

Figure 12:
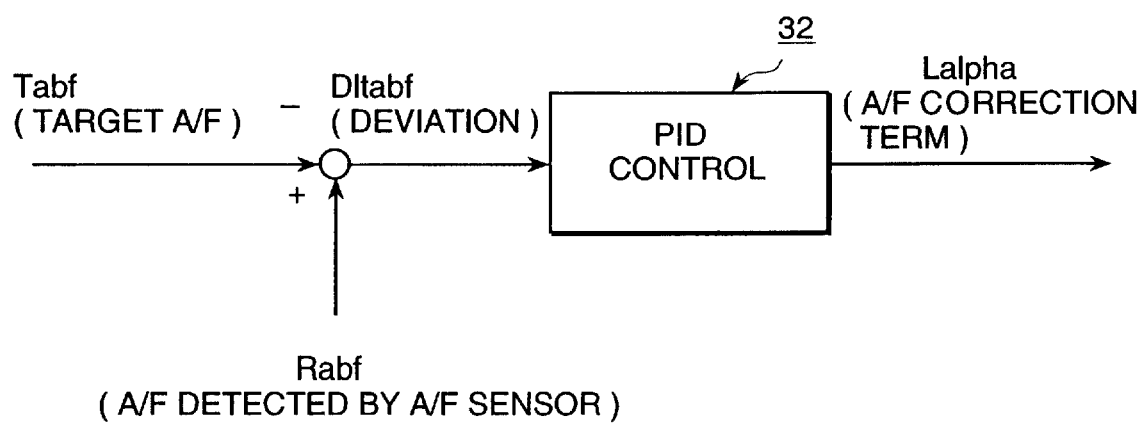
FIG. 12 shows an A/F correction term calculation unit in the control block diagram of FIG. 10.

FIG. 12 shows A/F correction term calculation unit 32. Here, A/F correction term calculation unit 32 feedback-controls A/F based on the A/F detected by A/F sensor 12 so that the A/F of internal combustion engine 1 may take the theoretical A/F in an arbitrary operating condition. Concretely, A/F correction term Lalpha is calculated from deviation Dltabf between the target A/F Tabf and the A/F Rabf detected by A/F sensor by using the PID control as shown in FIG. 12. A/F correction term Lalpha is multiplied by above-mentioned basic fuel injection amount Tp in order to always keep A/F of internal combustion engine 1 to the theoretical A/F.

3. Rich/lean control permission judgment part or unit 34.

Figure 13:
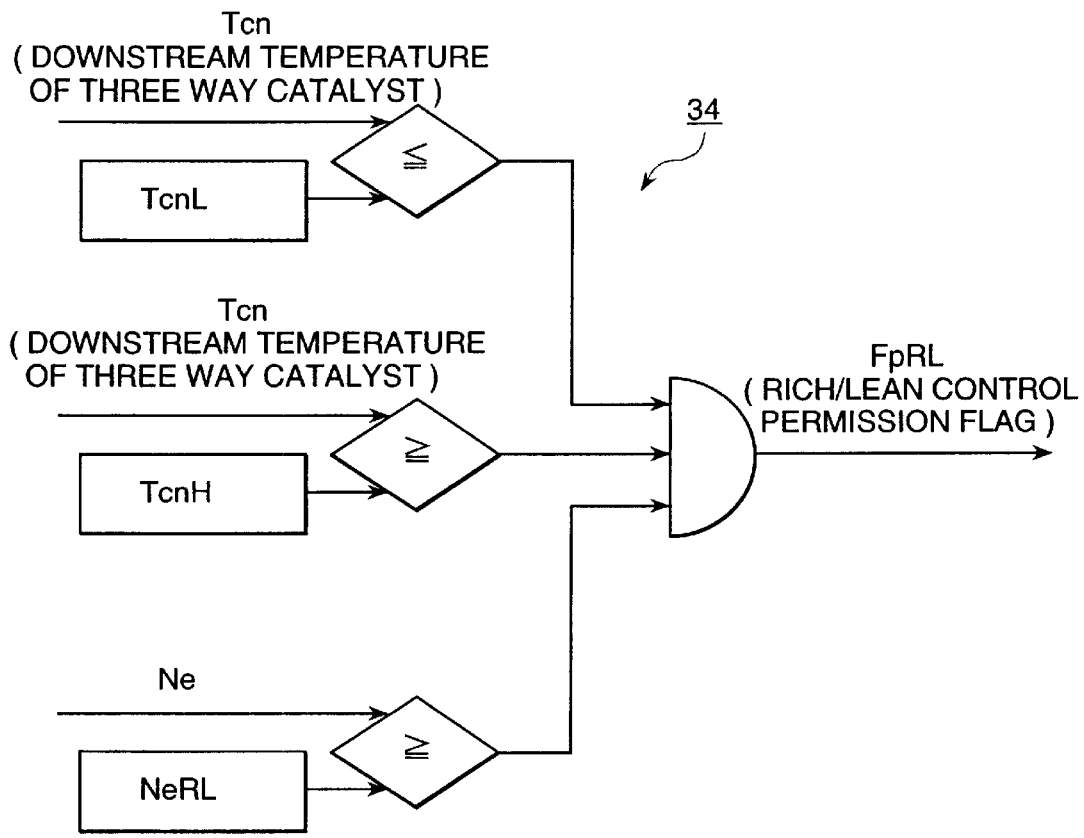
FIG. 13 shows a rich/lean control permission judgment unit in the control block diagram of FIG. 10.

FIG. 13 shows rich/lean control permission judgment part or unit 34. The rich/lean control permission judgment part 34 performs the permission judgment of the rich/lean control. Concretely, it sets the rich/lean control permission flag to FpRL=1 and permits the rich/lean control if Tcn≧TcnL, Tcn≦TcnH, and Ne≦NeRL, as shown in FIG. 13. Otherwise, Rich/lean control is prohibited, and FpRL=0 is set. Where, Tcn: downstream temperature of the three-way catalyst, and Ne: engine speed of the internal combustion engine.

It is preferable to set TcnL to the temperature at which the evaporation of moisture in the three-way catalyst is completed. The temperature becomes generally 50° C.–100° C., which depends on the location of the sensor, etc. It is preferable to set TcnH to the activation temperature of the three-way catalyst. The temperature becomes 250° C.–400° C., which depends on the catalyst performance. A decision has to be made as to both values of TcnL and TcnH according to the performance of the real machine performance. Further, although it is assumed the method to detect the exhaust gas temperature downstream of the catalyst is used in this embodiment, various methods of estimating from other operating conditions of the internal combustion engine without measuring the temperature directly are proposed. Therefore, it is also possible to use them within the scope of the present invention.

4. #1 cylinder A/F correction amount calculation unit 33a.

Figure 14:
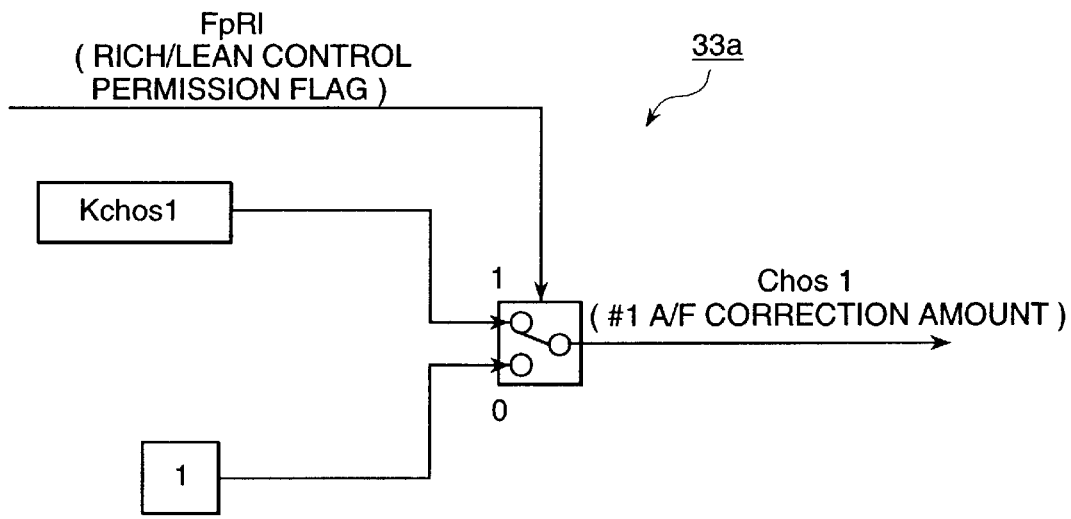
FIG. 14 shows a #1 cylinder A/F calculation unit in the control block diagram of FIG. 10.

FIG. 14 shows the #1 cylinder A/F correction amount calculation unit 33a. In the #1 cylinder A/F correction amount calculation unit 33a, the amount of the A/F correction in the first cylinder is calculated. The #1 cylinder A/F correction amount Chos1 is set to 0 at rich/lean control permission flag FpRL=0, and a fuel injection amount for each cylinder is calculated to obtain the theoretical A/F from the above-mentioned basic fuel injection amount Tp and A/F correction term Lalpha. The A/F of the first cylinder is changed in specified amount Kchos1 to supply the rich/lean exhaust to the entrance of three-way catalyst 11 at rich/lean control permission flag FpRL=1. Concretely, the processing shown in FIG. 14 is carried out. That is, it is assumed change amount Chos1=Kchos1 in the equivalence ratio of the #1 cylinder at rich/lean control permission flag FpRL=1, and assumed Chos1=0 at FpRL=0. It is desirable to set the value of Kchos1 from the performance of the degree of the temperature-rise of the three-way catalyst and the exhaust according to the characteristic of internal combustion engine 1 and three-way catalyst 11.

5. #2 cylinder A/F correction amount calculation unit 33b.

Figure 15:
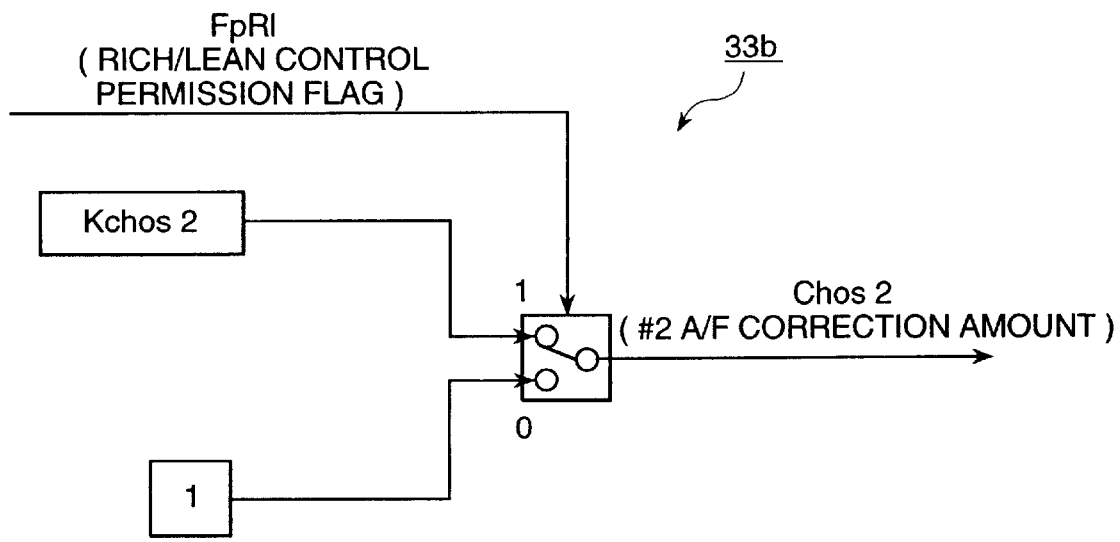
FIG. 15 shows a #2 cylinder A/F calculation unit in the control block diagram of FIG. 10.

FIG. 15 shows the #2 cylinder A/F correction amount calculation unit 33b. In the #2 cylinder A/F correction amount calculation unit 33b, the amount of the A/F correction in the second cylinder is calculated. The #1 cylinder A/F correction amount Chos2 is set to 0 at rich/lean control permission flag FpRL=0, and fuel injection amount for each cylinder is calculated to obtain the theoretical A/F from the above-mentioned basic fuel injection amount Tp and A/F correction term Lalpha. The A/F of the first cylinder is changed in specified amount Kchos2 to supply the rich/lean exhaust to the entrance of three-way catalyst 11 at rich/lean control permission flag FpRL=1. Concretely, the processing shown in FIG. 15 is carried out. That is, it is assumed change amount Chos2=Kchos2 in the equivalence ratio of the #2 cylinder at rich/lean control permission flag FpRL=1, and assumed Chos2=0 at FpRL=0. It is desirable to set the value of Kchos2 from the performance of the degree of the temperature-rise of the three-way catalyst and the exhaust according to the characteristic of internal combustion engine 1 and three-way catalyst 11.

6. #3 cylinder A/F correction amount calculation unit 33c.

Figure 16:
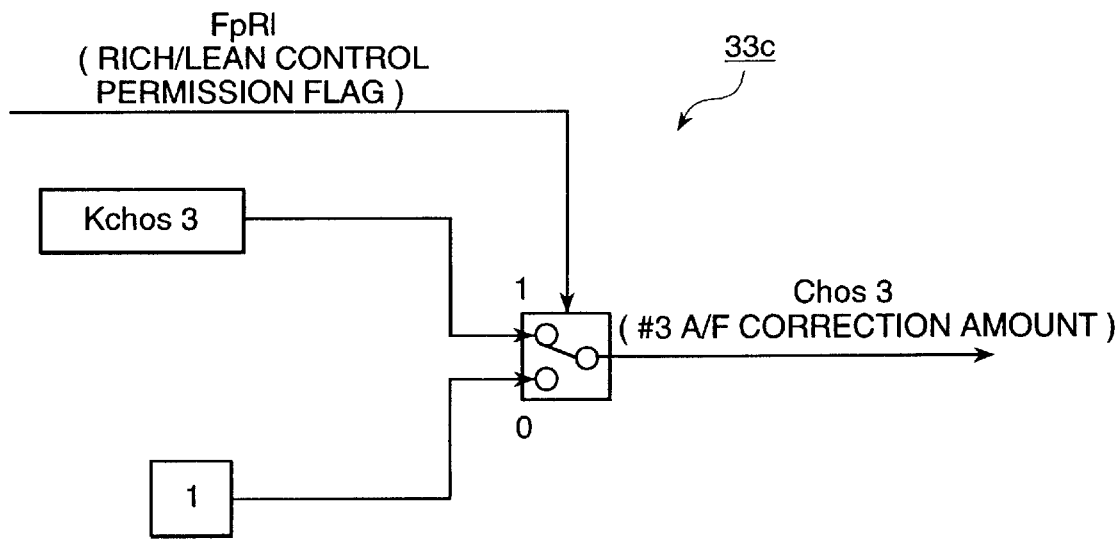
FIG. 16 shows a #3 cylinder A/F calculation unit in the control block diagram of FIG. 10.

FIG. 16 shows the #3 cylinder A/F correction amount calculation unit 33c. In the #3 cylinder A/F correction amount calculation unit 33c, the amount of the A/F correction in the third cylinder is calculated. The #3 cylinder A/F correction amount Chos3 is set to 0 at rich/lean control permission flag, FpRL=0, and fuel injection amount for each cylinder is calculated to obtain the theoretical A/F from the above-mentioned basic fuel injection amount Tp and A/F correction term Lalpha. The A/F of the third cylinder is changed in specified amount Kchos3 to supply the rich/lean exhaust to the entrance of three-way catalyst 11 at rich/lean control permission flag FpRL=1. Concretely, the processing shown in FIG. 16 is carried out. That is, it is assumed change amount Chos3=Kchos3 in the equivalence ratio of the #3 cylinder at rich/lean control permission flag FpRL=1 and assumed Chos3=0 at FpRL=0. It is desirable to set the value of Kchos1 from the performance of the degree of the temperature-rise of the three-way catalyst and the exhaust according to the characteristic of internal combustion engine 1 and three-way catalyst 11.

7. #4 cylinder A/F correction amount calculation unit 33d.

Figure 17:
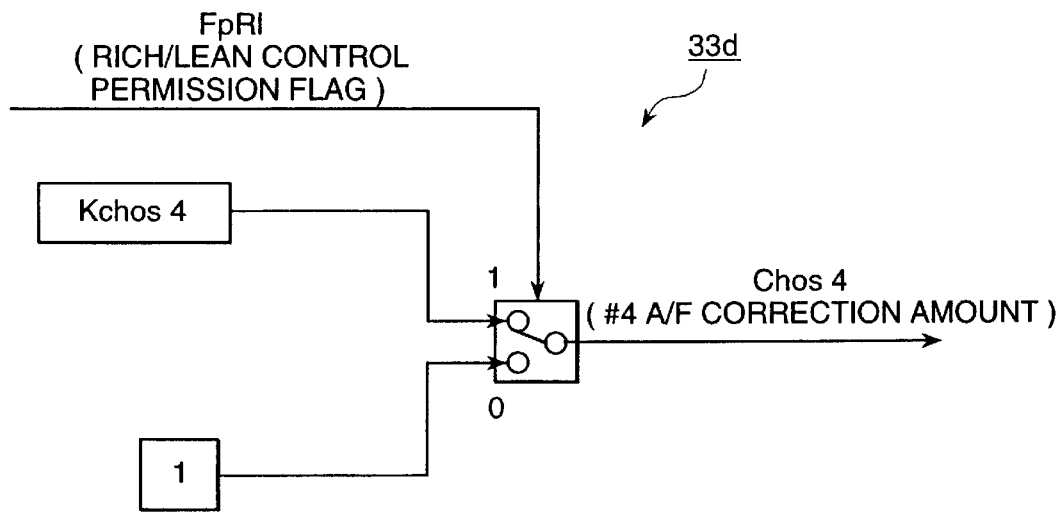
FIG. 17 shows a #4 cylinder A/F calculation unit in the control block diagram of FIG. 10.

FIG. 17 shows the #4 cylinder A/F correction amount calculation unit 33d. In the #4 cylinder A/F correction amount calculation unit 33d, the amount of the A/F correction in the forth cylinder is calculated. The #4 cylinder A/F correction amount Chos4 is set to 0 at rich/lean control permission flag FpRL=0, and fuel injection amount for each cylinder is calculated to obtain the theoretical A/F from the above-mentioned basic fuel injection amount Tp and A/F correction term Lalpha. The A/F of the forth cylinder is changed in specified amount Kchos4 to supply the rich/lean exhaust to the entrance of three-way catalyst 11 at rich/lean control permission flag FpRL=1. Concretely, the processing shown in FIG. 14 is carried out. That is, it is assumed change amount Chos4=Kchos4 in the equivalence ratio of the #4 cylinder at rich/lean control permission flag FpRL=1, and assumed Chos4=0 at FpRL=0. It is desirable to set the value of Kchos1 from the performance of the degree of the temperature-rise of the three-way catalyst and the exhaust according to the characteristic of internal combustion engine 1 and three-way catalyst 11.

Second Embodiment

Figure 18:
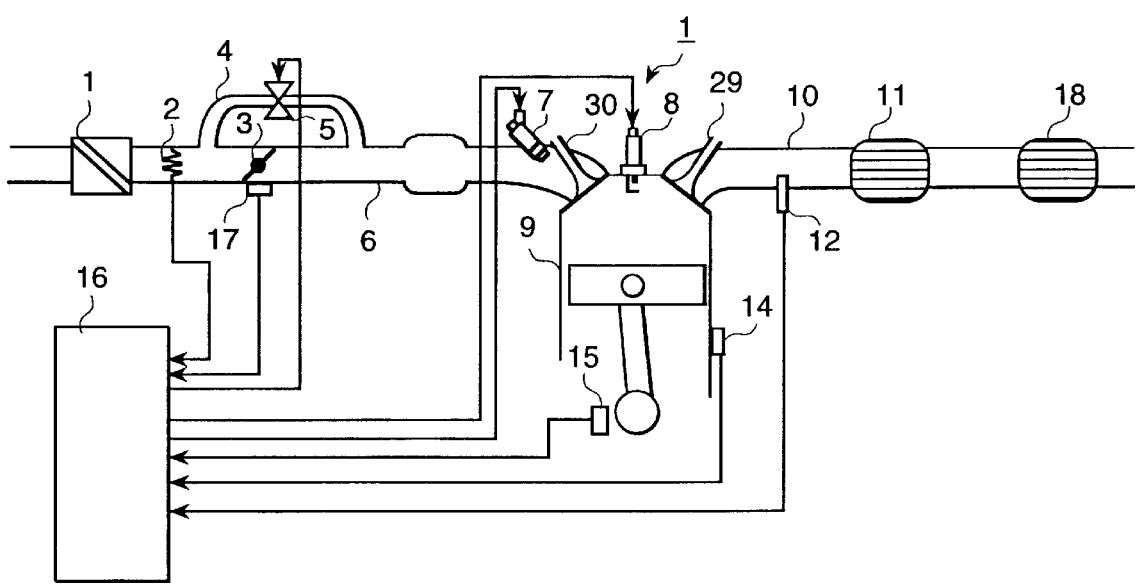
FIG. 18 shows the overall internal combustion engine system according to a second embodiment of the control unit for an internal combustion engine of the present invention.

FIG. 18 shows the overall system of the internal combustion engine according to the second embodiment of a control unit for an internal combustion engine of the present invention. Because the second embodiment is the same as the first embodiment, except that the temperature sensor 13 is not provided, a further explanation is unnecessary.

Figure 19:
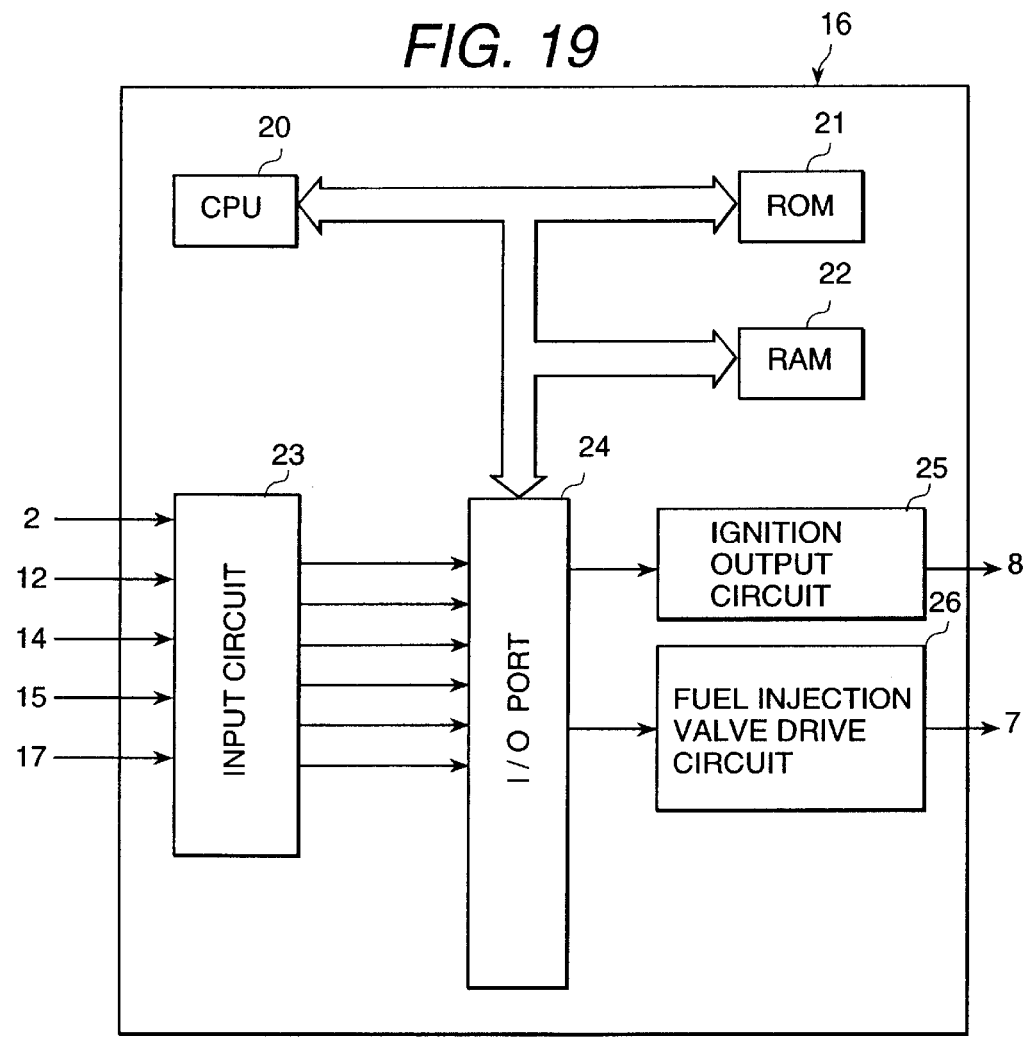
FIG. 19 shows the internal construction of a control unit for the internal combustion engine shown in FIG. 18.

FIG. 19 shows a second embodiment of an internal configuration of control unit 16 whose configuration is the same as the first embodiment, excluding the input terminal of temperature sensor 13. Therefore, an explanation of this second embodiment is unnecessary. A control block diagram showing the entire control of control unit 16 according to the embodiment of FIG. 19 is the same as one of the first embodiment of FIG. 10, except that the input signal of rich/lean control permission judgment part 34 is different. The control block diagram need not be shown for this embodiment, and reference to FIG. 10 is made instead.

Control unit 16 of this second embodiment comprises basic fuel injection amount calculation unit 31, A/F correction term calculation unit 32, #1 cylinder A/F correction amount calculation unit 33a, #2 cylinder A/F correction amount calculation unit 33b, #3 cylinder A/F correction amount calculation unit 33c, #4 cylinder A/F correction amount calculation unit 33d, and rich/lean control, permission judgment part 34. When the rich/lean control is not permitted, control unit 16 calculates fuel injection amount for each cylinder so that the A/F for all cylinders may become the theoretical A/F. When the rich/lean control is permitted, the rich exhaust and the lean exhaust are supplied to the entrance of three-way catalyst 11, and the A/F for each cylinder is changed in the specified amount in order to activate the three-way catalyst 11 at an early stage. Hereafter, each calculation unit of control unit 16 will be explained in detail.

1. Basic fuel injection amount calculation unit 31 and 2. A/F correction term calculation unit 32.

Because basic fuel injection amount calculation unit 31 and A/F correction term calculation unit 32 are the same as the first embodiment (FIG. 11 and FIG. 12), a further explanation is unnecessary.

3. Rich/lean control permission judgment part 34

Figure 20:
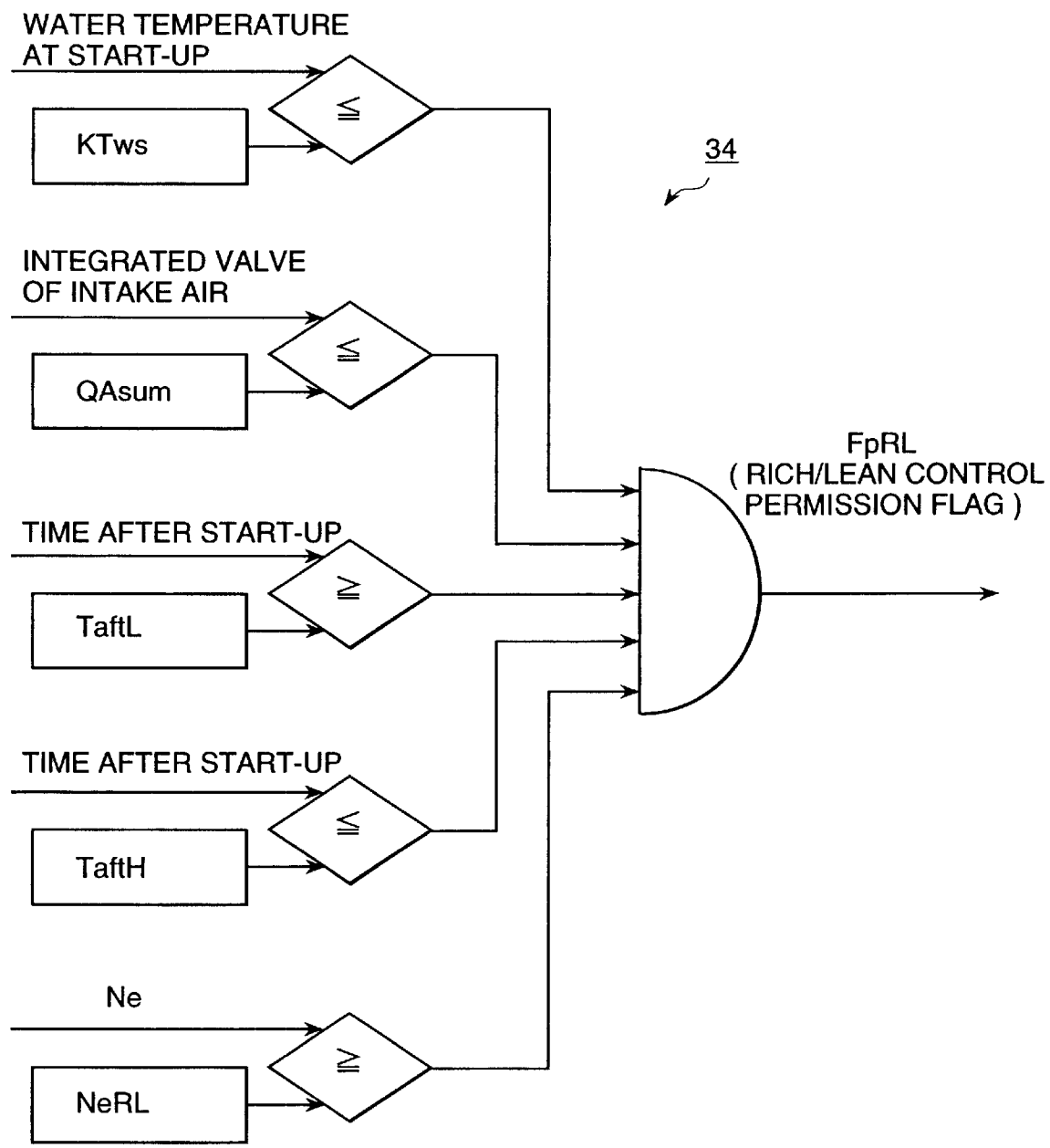
FIG. 20 shows a rich/lean control permission judgment unit in the control unit for an internal combustion engine of FIG. 18.

FIG. 20 shows rich/lean control permission judgment part 34. In the rich/lean control permission judgment part 34, the permission judgment of rich/lean control is carried out. Concretely, it sets the rich/lean control permission flag to FpRL=1 and permits the rich/lean control if water temperature at start≦KTws, inflow air amount integrated value≦Qasum, time TaftL after start or more, time TaftH after start or less, and Ne≦NeRL, as shown in FIG. 13. Otherwise, Rich/lean control is prohibited, and FpRL=0 is set. Where, Ne: engine speed of the internal combustion engine.

It is preferable to perform the rich/lean control to the activation of three-way catalyst 11 after the moisture in three-way catalyst 11 evaporates as shown by the first embodiment. Each such parameter should be determined to suit the above condition.

4. #1 cylinder A/F correction amount calculation unit 33a; 5. #2 cylinder A/F correction amount calculation unit 33b; 6. #3 cylinder A/F correction amount calculation unit 33c; and 7. #4 cylinder A/F correction amount calculation unit 33d. Because the #1 to #4 cylinder A/F correction amount calculation units 33a, 33b, 33c, and 33d are the same as the first embodiment (FIG. 14–FIG. 17), a further explanation is unnecessary.

Third Embodiment

Figure 21:
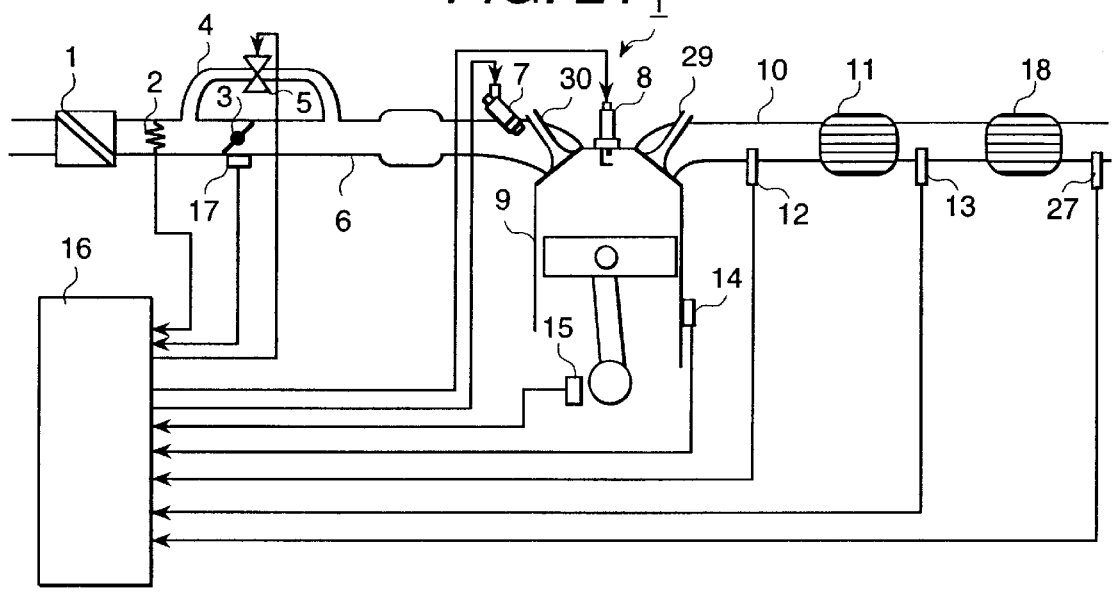
FIG. 21 shows the overall internal combustion engine system according to a third embodiment of the control unit for an internal combustion engine of the present invention.

FIG. 21 shows the overall system of the internal combustion engine according to the third embodiment of a control unit for an internal combustion engine of the present invention. Because the third embodiment is same as the first embodiment, excluding the temperature sensor 27 installed downstream of HC adsorption catalyst 18, a further explanation of FIG. 21 is unnecessary.

Figure 22:
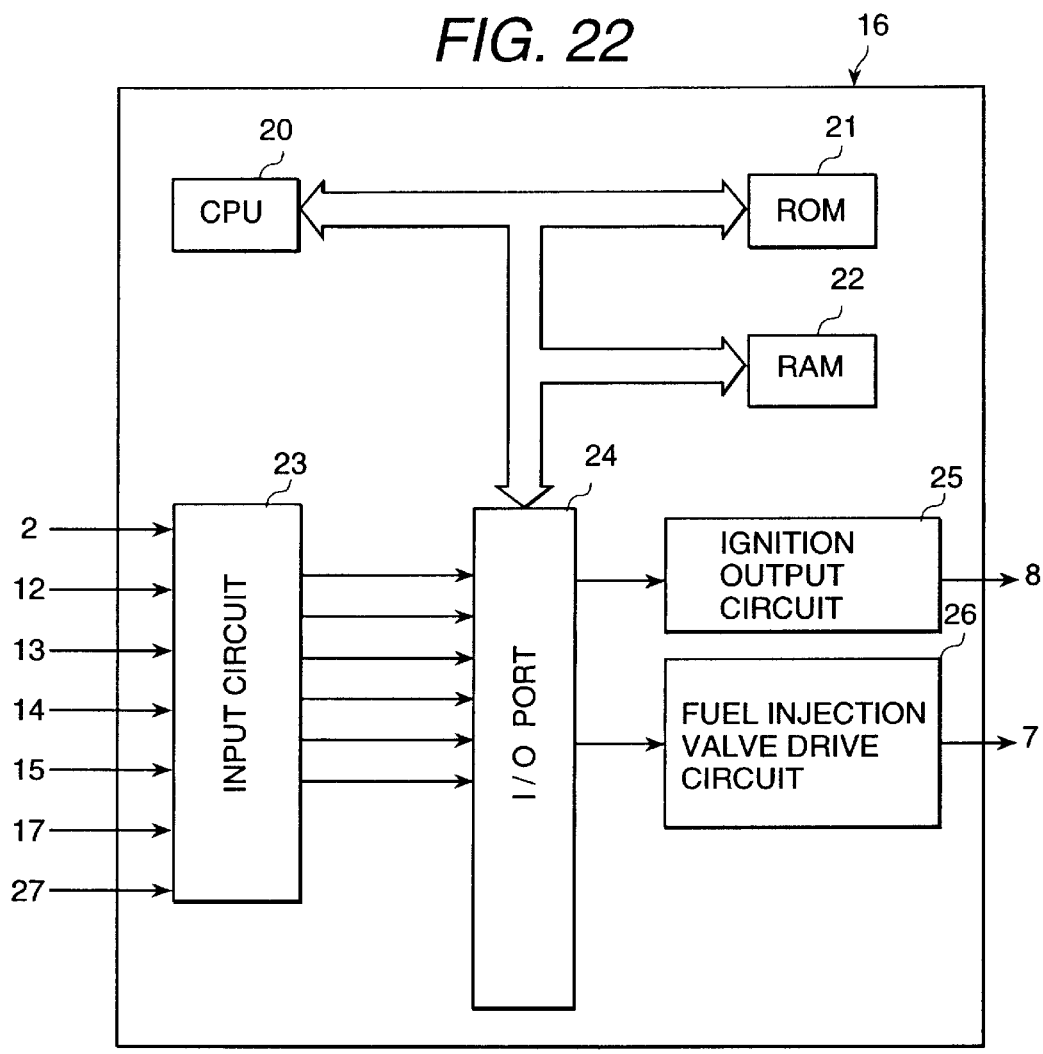
FIG. 22 shows the internal construction of a control unit for the internal combustion engine shown in FIG. 21.

FIG. 22 shows an internal configuration of control unit 16 whose configuration is the same as the first embodiment, excluding the input terminal of temperature sensor 13, an explanation of this further configuration is unnecessary.

Figure 23:
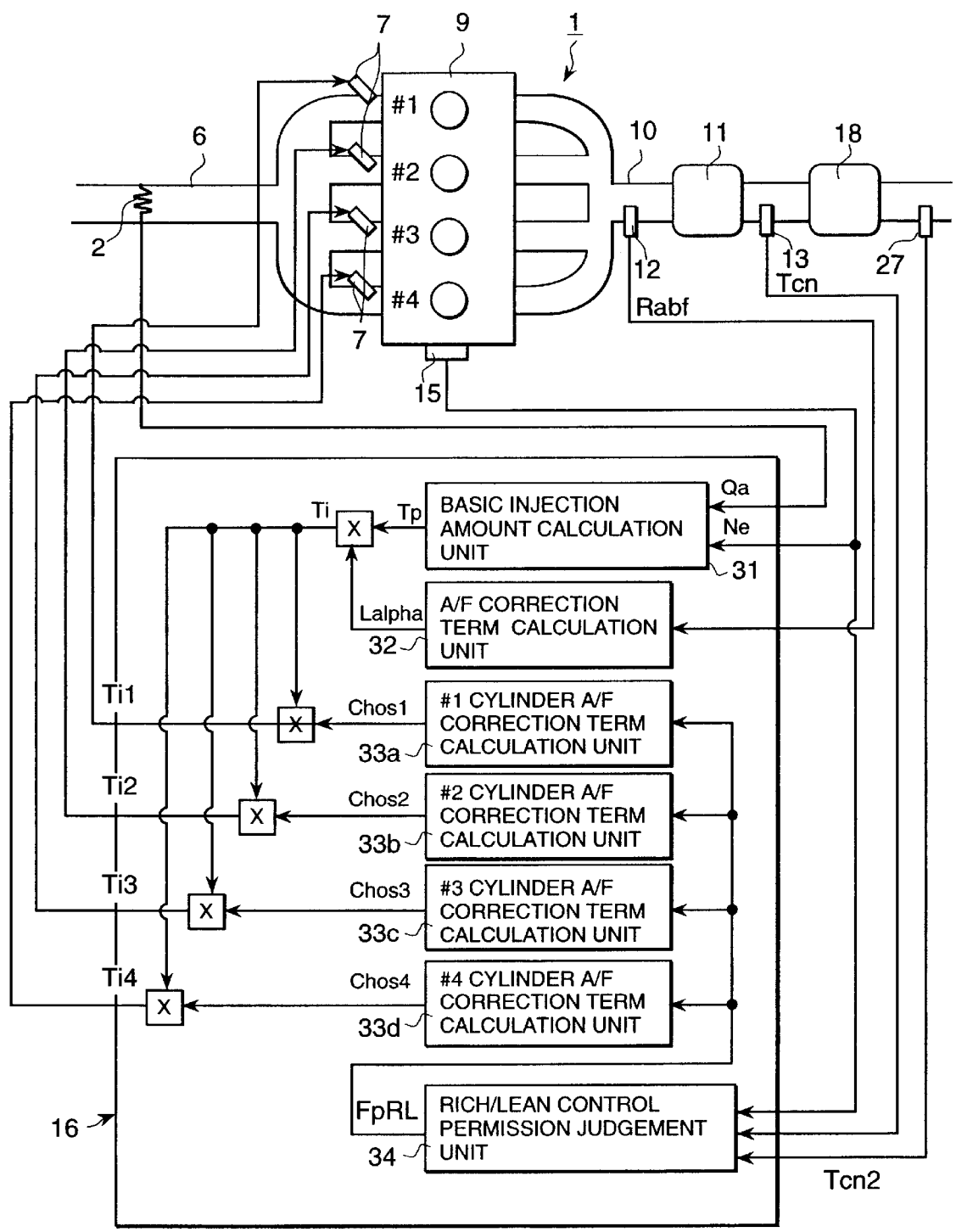
FIG. 23 shows a control unit for an internal combustion engine shown in FIG. 21.

FIG. 23 is a control block diagram showing the entire control of control unit 16 according to the embodiment shown in FIG. 22. Control unit 16 comprises basic fuel injection amount calculation unit 31, A/F correction term calculation unit 32, #1 cylinder A/F correction amount calculation unit 33a, #2 cylinder A/F correction amount calculation unit 33b, #3 cylinder A/F correction amount calculation unit 33c, #4 cylinder A/F correction amount calculation unit 33d, and rich/lean control permission judgment part 34.

When the rich/lean control is not permitted, control unit 16 calculates a fuel injection amount for each cylinder so that the A/F for all cylinders may become the theoretical A/F. When the rich/lean control is permitted, the rich exhaust and the lean exhaust are supplied to the entrance of three-way catalyst 11, in order to activate the three-way catalyst 11 at an early stage or optimize the temperature-rise characteristic of HC adsorption catalyst 18. Hereafter, each calculation unit of control unit 16 will be explained in detail.

1. Basic fuel injection amount calculation unit 31 and 2. A/F correction term calculation unit 32.

Because basic fuel injection amount calculation unit 31 and A/F correction term calculation unit 32 are the same as the first embodiment (FIG. 11 and FIG. 12), a further explanation is unnecessary.

3. Rich/lean control permission judgment part 34

Figure 24:
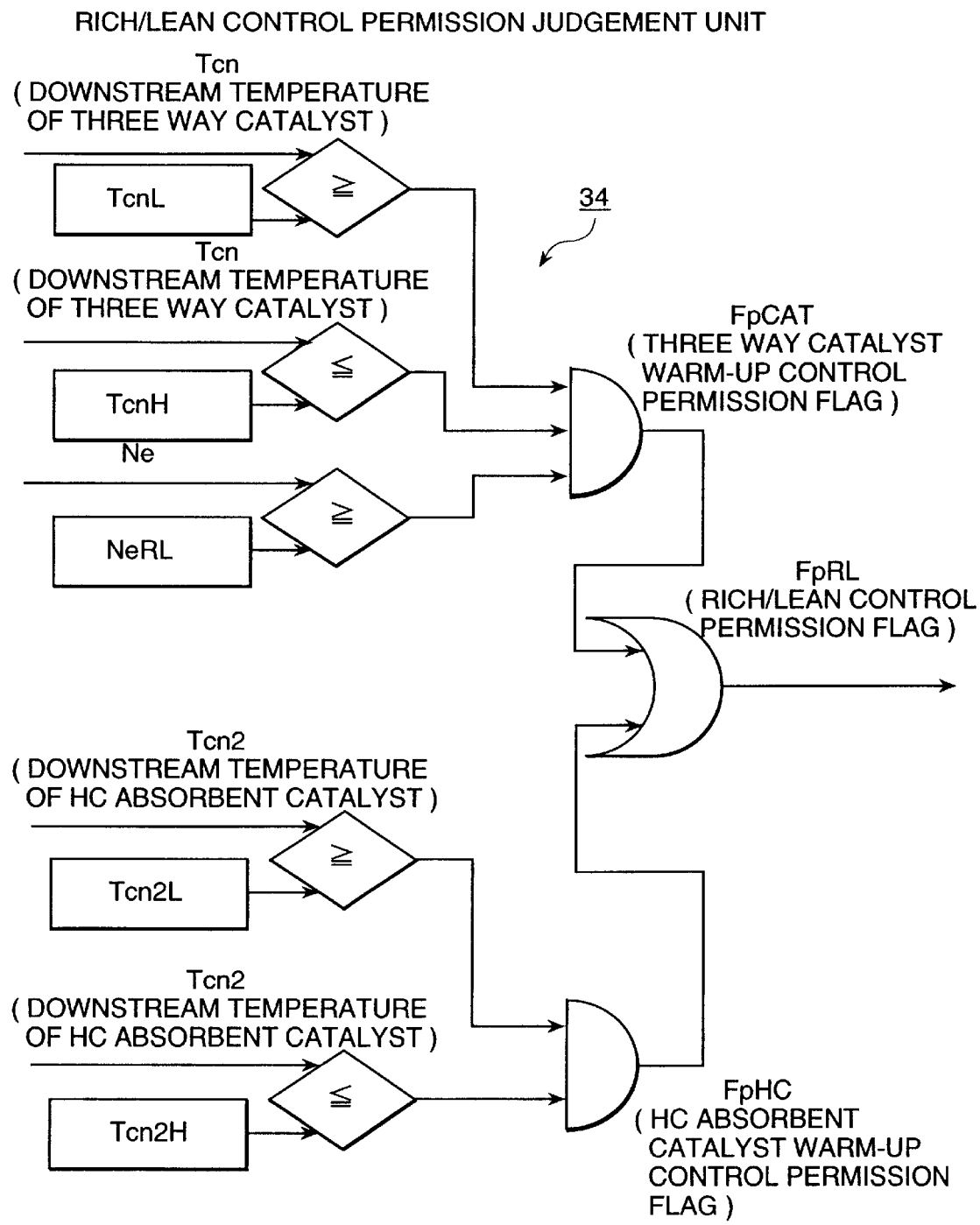
FIG. 24 shows a rich/lean control permission judgment unit in the control block diagram of FIG. 23.

FIG. 24 shows rich/lean control permission judgment part 34. In the rich/lean control permission judgment part 34, the permission judgment of rich/lean control is carried out. The rich/lean control has two purposes, i.e., the temperature-rise of three-way catalyst 11 and that of HC adsorption catalyst 18. Further, the permission condition is also roughly divided into the temperature-rise control of the three-way catalyst and that of HC adsorption catalyst.

Concretely, it sets three-way catalyst temperature-rise control permission flag to FpCAT=1 if Tcn≧TcnL, Tcn≦TcnH, and Ne≦Ne RL,. Otherwise, FpCAT=0. Where, Tcn: three-way catalyst downstream temperature and Ne: engine speed of the internal combustion engine. Further, it sets three-way catalyst temperature-rise control permission flag to FpHC=1 if Tcn2≧Tcn2L and Tcn2≦Tcn2H, otherwise, FpHC=0. Where, Tcn: HC adsorption catalyst downstream temperature. It is preferable to set TcnL to the temperature at which the evaporation of moisture in the three-way catalyst is completed. The temperature becomes generally 50° C.–100° C., which depends on the location of the sensor, etc.

It is preferable to set TcnH to the activation temperature of the three-way catalyst. The temperature becomes 250° C.–400° C., which depends on the catalyst performance. It is preferable to set Tcn2L to the temperature at which the adsorbed HC of the HC adsorption catalyst starts to be desorbed. The temperature becomes generally 100° C.–200° C., which depends on the location of the sensor, etc. Further, it is preferable to set Tcn2H to the activation temperature of the three-way catalyst in the HC adsorption catalyst 18. The temperature becomes 250° C.–400° C., which depends on the catalyst performance. The values of TcnL, TcnH, Tcn2L and Tcn2H must be decided according to the real machine performance.

4. #1 cylinder A/F correction amount calculation unit 33a; 5. #2 cylinder A/F correction amount calculation unit 33b; 6. #3 cylinder A/F correction amount calculation unit 33c; and 7. #4 cylinder A/F correction amount calculation unit 33d. Because the #1 to #4 cylinder A/F correction amount calculation units 33a, 33b, 33c, and 33d are the same as the first embodiment (FIG. 14–FIG. 17), a further explanation is unnecessary.

Although it is assumed the specification which raises temperature up to the temperature to which three-way performance in HC adsorption catalyst 18 is activated at the quickest velocity when the adsorbed HC in HC adsorption catalyst 18 starts to desorb in this embodiment, actually, it is also good to feedback control based on the output of temperature sensor 27 according to the best temperature-rise curve. In this case, the temperature of HC adsorption catalyst 18 is adjusted by repeating an ON/OFF state of rich/lean control.

Fourth Embodiment

Figure 25:
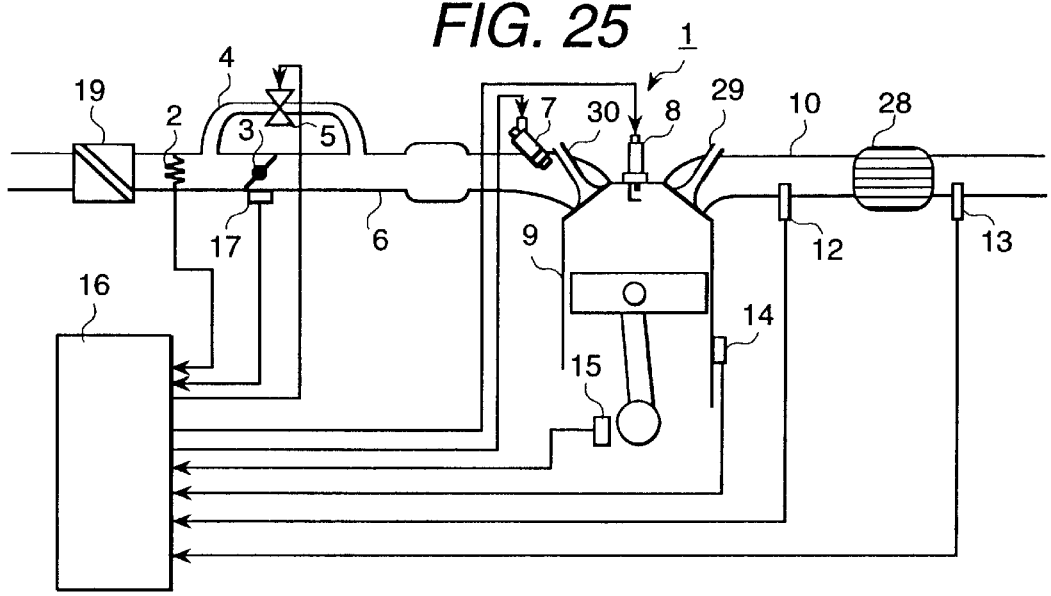
FIG. 25 shows the overall internal combustion engine system according to a fourth embodiment of the control unit for an internal combustion engine of the present invention.

FIG. 25 shows the overall system of the internal combustion engine according to the fourth embodiment of a control unit for an internal combustion engine of the present invention. Catalyst 28 is a catalyst in which the HC adsorbent and the three-way catalyst are supported by the same carrier. Because the configuration except the catalyst 28 is the same as the first embodiment, a further explanation of other configuration is unnecessary.

The control unit for an internal combustion engine according to this embodiment is the same as that in the first embodiment. However, the control is preferably set to a set temperature TcnH downstream of the catalyst, not to the temperature at which the evaporation of moisture in the three-way catalyst is completed, but to the temperature at which the adsorbed HC of the HC adsorption catalyst starts to be desorbed. The temperature becomes generally 100° C.–200° C., which depends on the location of the sensor, etc. Actually, as described in connection with the first embodiment, it is also desirable to feedback control based on the output of temperature sensor 13 according to the best temperature-rise curve. In this case, the temperature of HC adsorption catalyst is adjusted by repeating an ON/OFF state of rich/lean control.

Fifth Embodiment

Figure 26:
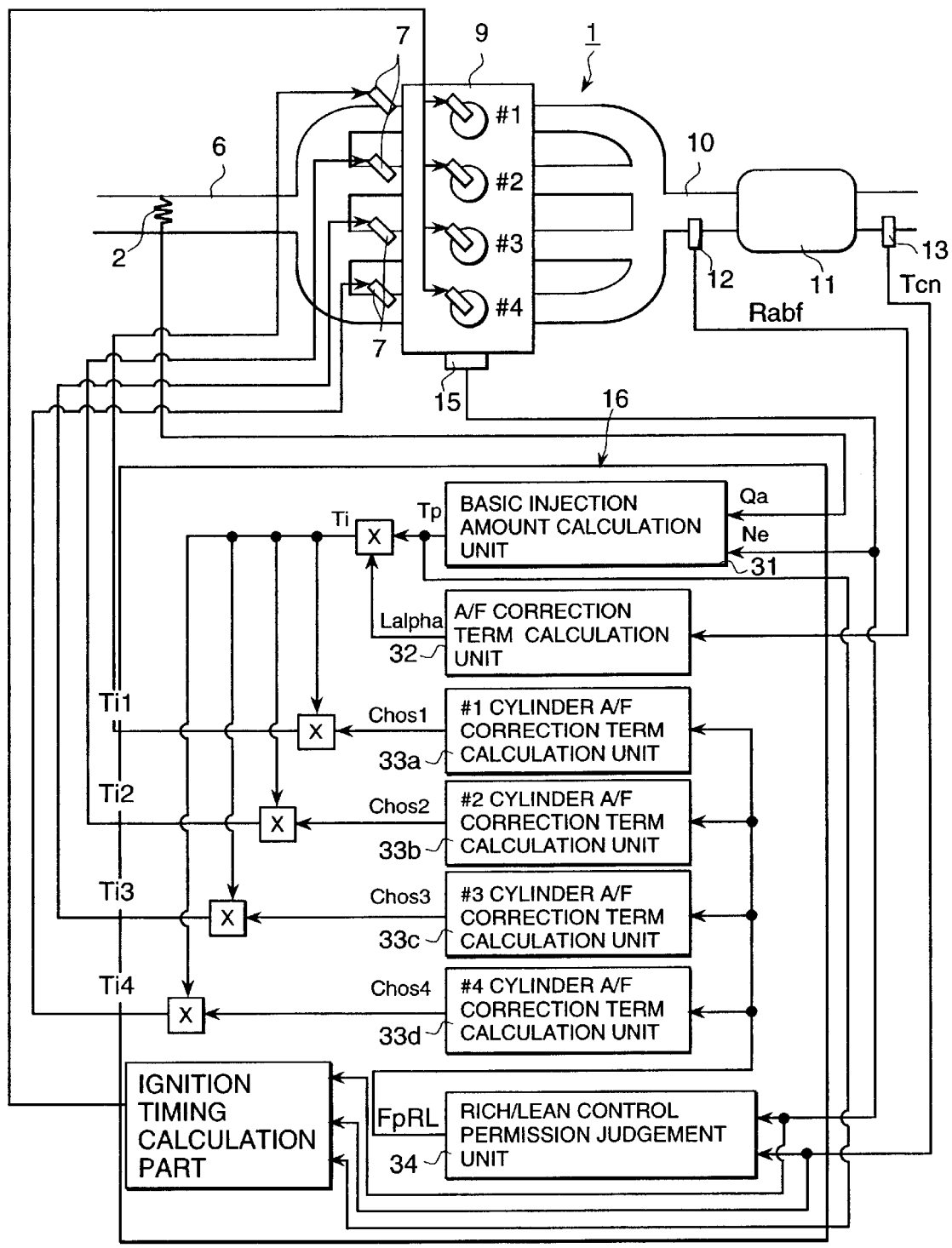
FIG. 26 shows a fifth embodiment of the control unit for an internal combustion engine of the present invention.

FIG. 26 is a control block diagram showing the overall control of control unit 16 according to the fifth embodiment of the present invention. The control unit 16 comprises basic fuel injection amount calculation unit 31, A/F correction term calculation unit 32, #1 cylinder A/F correction amount calculation unit 33a, #2 cylinder A/F correction amount calculation unit 33b, #3 cylinder A/F correction amount calculation unit 33c, #4 cylinder A/F correction amount calculation unit 33d, rich/lean control permission judgment part 34 and ignition time calculation unit 35. Because control unit 16 is the same as the first embodiment, excluding ignition time calculation unit 35, a further explanation is unnecessary.

Control unit 16 of the internal combustion engine according to this embodiment operates to evaporate the moisture in three-way catalyst 11 at the early stage and to heighten an effect of the rich/lean control. The retardation is set at the ignition time when internal combustion engine 1 is started. Moreover, when the rich/lean control is not permitted, a fuel injection amount of each cylinder is calculated so that the A/F of all cylinders may become the theoretical A/F. When the rich/lean control is permitted, the A/F of each cylinder is changed in the specified amount to activate three-way catalyst 11 at the early stage by supplying the rich exhaust and the lean exhaust to the entrance of three-way catalyst 11. Hereinafter, each calculation unit of the control unit 16 will be explained in detail.

1. Basic fuel injection amount calculation unit 31; 2. A/F correction term calculation unit 32; 3. Rich/lean control permission judgment part 34; 4. #1 cylinder A/F correction amount calculation unit 33a; 5. #2 cylinder A/F correction amount calculation unit 33b; 6. #3 cylinder A/F correction amount calculation unit 33c; 7. #4 cylinder A/F correction amount calculation unit 33d.

Because basic fuel injection amount calculation unit 31, A/F correction term calculation unit 32, rich/lean control permission judgment part 34, and #1 to #4 cylinder A/F correction amount calculation units 33a, 3b, 33c and 33d are the same as the first embodiment (FIG. 11–FIG. 17), a further explanation is unnecessary.

8. Ignition time calculation unit

Figure 27:
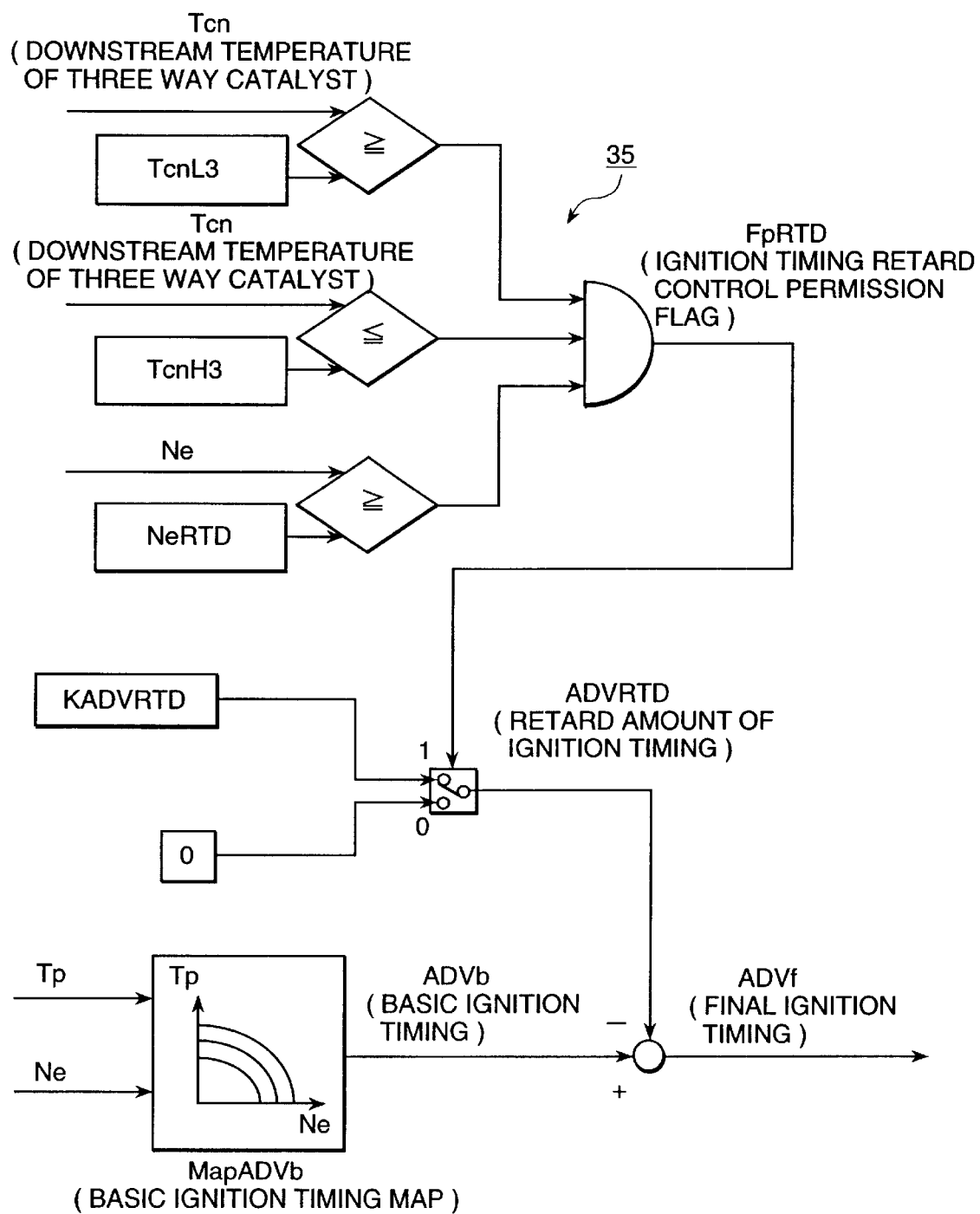
FIG. 27 shows an ignition time calculation unit in the control block diagram of FIG. 26.

FIG. 27 shows ignition time calculation unit 35. In the ignition time calculation unit 35, the permission judgment of rich/lean control is performed. Final ignition time ADVf is calculated according to ADVf=ADVb-ADVRTD as shown in FIG. 27. Where, ADVb: basic ignition time and ADVRTD: ignition time retard amount. Basic ignition time ADVb is obtained with reference to basic ignition time MapADVb from basic fuel injection amount Tp and internal combustion engine revolution speed Ne.

Ignition time retard amount ADVRTD is ADRTD= KADVRTD if retard control permission flag FpRTD=1 of the ignition time, and ADVRTD=0 if FpRTD=0. Retard control permission flag FpRTD of the ignition time assumes FpRTD=1 when three-way catalyst downstream temperature Tcn is Tcn≧TcnL3, Tcn≦TcnH3, and Ne≧NeRTD, and the retard is performed. Otherwise, FpRTD=0, and the retard is not performed.

Because one of the purposes of this embodiment is to evaporate promptly the moisture in three-way catalyst 11, it is preferable to set TcnL3 to at least 50° C. or less. Further, it is preferable to set TcnH3 so that the maximum effect may be achieved in the rich/lean control by setting the activation temperature of the three-way catalyst as the maximum value. It is preferable to set retard amount KADVRTD to the retard limit determined according to the stability of the internal combustion engine and it is determined according to the performance of the internal combustion engine. Further, basic ignition time map MapADVb is determined according to the performance of the internal combustion engine to become a so-called MBT.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. A control unit for an internal combustion engine having a three-way catalyst on an exhaust side of the engine, said control unit having means for detecting completion of moisture evaporation in said three-way catalyst, and being configured to alternately control air-fuel ratio (A/F) between a rich state and a lean state to quicken activation of said three-way catalyst upon detection of completion of the moisture evaporation in said three way catalyst.

2. The control unit according to claim 1, wherein ignition time is retarded for a period until moisture in said three-way catalyst evaporates directly after the starting of said internal combustion engine.

* * * * *